US010475145B1

(12) United States Patent
Lester

(10) Patent No.: US 10,475,145 B1
(45) Date of Patent: Nov. 12, 2019

(54) SMART WATERMARKING

(71) Applicant: SHUTTERSTOCK, INC., New York, NY (US)

(72) Inventor: Kevin Lester, Summit, NJ (US)

(73) Assignee: SHUTTERSTOCK, INC., New York, NY (US)

(*) Notice: Subject to any disclaimer, the term of this patent is extended or adjusted under 35 U.S.C. 154(b) by 42 days.

(21) Appl. No.: 15/849,923

(22) Filed: Dec. 21, 2017

(51) Int. Cl.
G06K 9/00 (2006.01)
G06T 1/00 (2006.01)
G06T 5/00 (2006.01)

(52) U.S. Cl.
CPC ............ *G06T 1/0071* (2013.01); *G06T 5/002* (2013.01); *G06T 2207/20084* (2013.01)

(58) Field of Classification Search
CPC ........ B41J 11/007; B41J 11/008; B41J 29/38; B41J 2/04501; B41J 2/2132; G06K 15/18; G06K 15/1868; G06K 15/1889; G06T 1/0071; G06T 5/002; G06T 2207/20084

See application file for complete search history.

(56) References Cited

U.S. PATENT DOCUMENTS

| 2012/0308071 A1* | 12/2012 | Ramsdell | H04N 1/32144 |
| | | | 382/100 |
| 2014/0241568 A1* | 8/2014 | Yamada | G06T 1/0021 |
| | | | 382/100 |
| 2018/0278796 A1* | 9/2018 | Hasegawa | H04N 1/32144 |

* cited by examiner

Primary Examiner — Xin Jia
(74) Attorney, Agent, or Firm — McDermott Will & Emery LLP

(57) ABSTRACT

Various aspects of the subject technology relate to systems, methods, and machine-readable media for watermarking an identification mark on an image. A system may provide an image to a trained convolutional neural network to generate a saliency map. The saliency map includes saliency information which identifies a salient region of the image and a non-salient region of the image. The system may be configured to determine a level of aggressiveness based on a weight model. The weight model includes information regarding a popularity of the image, a value of the image, a geographic location of the image, and a user account associated with the image. The system is configured to overlap the watermark with one of the identified salient region and the non-salient region based on the level of aggressiveness to generate a watermarked image.

20 Claims, 10 Drawing Sheets

SMART WATERMARKING

BACKGROUND

Field

The present disclosure generally relates to digital representation of an image, and more particularly to placement of a watermark on an image.

Description of the Related Art

Digital media such as digital photographs often have monetary or sentimental values, but also are easily copyable when shared over a digital network. As a result, an owner of the digital media can put protection in place to prevent or deter unauthorized copying and use of their digital property. A standard approach to applying protection is to affix an identification mark (e.g., watermark) to the digital media, which partially obscures the image in an attempt to make it unusable to any unauthorized consumers. As technology has advanced, many people have adopted a practice of creating more complex and invasive watermarks that are harder to remove.

Complex and invasive watermarks, while generally being harder to defeat, also can devalue the digital media as it can detract from the quality of the image and make the image more difficult to enjoy. Accordingly, it may be challenging to facilitate the digital media owners' application of watermarks to their images for protection, while still facilitating viewers (e.g., non-owner) of the images to enjoy the important parts of the digital media.

SUMMARY

According to certain aspects of the present disclosure, a method for providing a watermark on an image is provided. The method includes generating a saliency map for a user-provided image where the saliency map includes a saliency value of a plurality of pixels in the user-provided image. The method also includes identifying, based on the saliency map, a salient region of the user-provided image having a highest saliency value and a non-salient region of the user-provided image having a lowest saliency value where a saliency value is indicative of the likelihood that a pixel within the user-provided image is important. The method further includes determining a level of aggressiveness of a watermark to use with the user-provided image based on a weight model. The method includes configuring the watermark to overlap with at least one of the identified salient region or the non-salient region based on the determined level of aggressiveness to generate a watermarked image.

According to certain aspects of the present disclosure, a system for providing a watermark on an image is provided. The system includes one or more processors and a memory coupled to the one or more processors, the memory including instructions that, when executed by the one or more processors, cause the one or more processors to generate a saliency map for a user-provided image where the saliency map includes a saliency value of a plurality of pixels in the user-provided image. The instructions also cause the processor to identify, based on the saliency map, a salient region of the user-provided image having a highest saliency value and a non-salient region of the user-provided image having a lowest saliency value where a saliency value is indicative of the likelihood that a pixel within the user-provided image is important. The instructions further cause the processor to determine a level of aggressiveness of a watermark to use with the user-provided image based on a weight model. The instructions cause the processor to configure the watermark to overlap with at least one of the identified salient region and the non-salient region based on the determined level of aggressiveness to generate a watermarked image.

According to certain aspects of the present disclosure, a method for providing a watermark on an image is provided. The method includes sending, at a client device, a request for a saliency map of an image, the saliency map including a saliency value of a plurality of pixels in the image and receiving, from a trained convolutional neural network where the saliency map identifies a salient region of the image having a highest saliency value and a non-salient region of the image having a lowest saliency value, a saliency value is indicative of the likelihood that a pixel within the image is important. The method further includes determining a level of aggressiveness of a watermark to use with the image based on a weight model. The method includes configuring the watermark to overlap with at least one of the identified salient region and the non-salient region based on the determined level of aggressiveness to generate a watermarked image.

According to one embodiment of the present disclosure, a non-transitory computer readable storage medium is provided including instructions that, when executed by a processor, cause the processor to perform operations including generating a saliency map for a user-provided image where the saliency map includes a saliency value of a plurality of pixels in the user-provided image. The operations also include identifying, based on the saliency map, a salient region of the user-provided image having a highest saliency value and a non-salient region of the user-provided image having a lowest saliency value where a saliency value is indicative of the likelihood that a pixel within the user-provided image is important. The operations further include determining a level of aggressiveness of a watermark to use with the user-provided image based on a weight model. The operations include configuring the watermark to overlap with at least one of the identified salient region and the non-salient region based on the determined level of aggressiveness to generate a watermarked image.

According to certain aspects of the present disclosure, a system is provided that includes means for generating a saliency map for a user-provided image where the saliency map includes a saliency value of a plurality of pixels in the user-provided image; and means for identifying, based on the saliency map, a salient region of the user-provided image having a highest saliency value and a non-salient region of the user-provided image having a lowest saliency value where a saliency value indicative of the likelihood that a pixel within the user-provided image is important; determining a level of aggressiveness of a watermark to use with the user-provided image based on a weight model; and configuring the watermark for display to overlap with at least one of the identified salient region and the non-salient region based on the determined level of aggressiveness to generate a watermarked image.

It is understood that other configurations of the subject technology will become readily apparent to those skilled in the art from the following detailed description, wherein various configurations of the subject technology are shown and described by way of illustration. As will be realized, the subject technology is capable of other and different configurations and several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
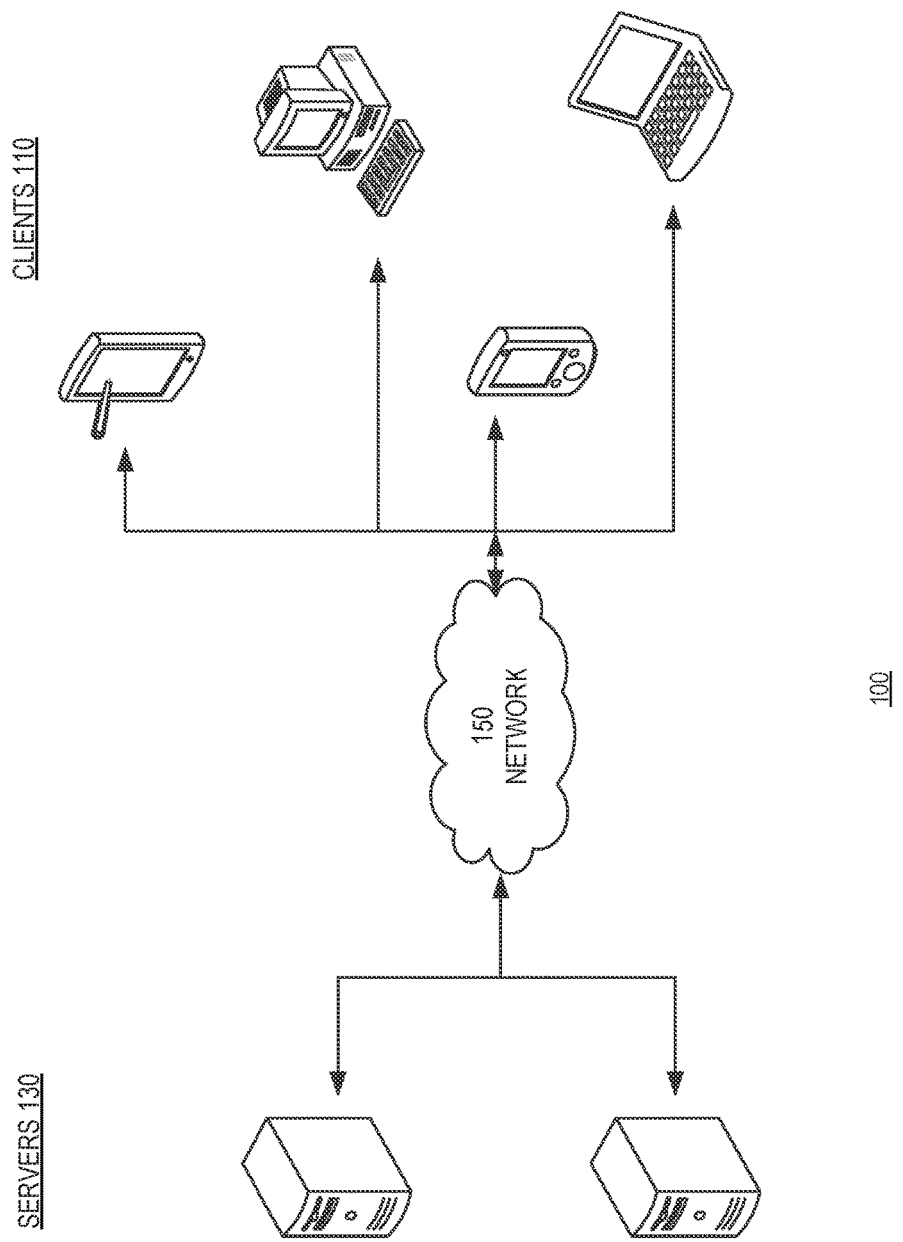
FIG. 1 illustrates an example architecture for placement of a watermark on an image according to some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image. As used herein, the term "saliency" may refer to the quality by which an object within an image (e.g., a foreground object detected, for example, via object detection) is deemed most useful for a neural network to perform the classification task. The term "saliency map" as used herein may refer to a mapping where each pixel has an associated saliency value, where the saliency value of a pixel may be referred to as the normalized attention that the pixel has in the overall scene. The term "training data" as used herein may refer to as a set of images containing positive instances of desired classes and a set of images used as negative instances (i.e., excluding any instance of the desired classes) used to train an object classifier. As used herein, the term "search term" may refer to a word in a query or portion of a query comprised of a string of text, which may be a single term or multiple terms. The term "watermark" as used herein may refer to an identification mark representing an ownership of an image.

General Overview

Identification marks such as watermarks used to prohibit an unauthorized use of an image are often placed in the center of the image. It may not be easy for someone to remove a centered watermark completely. However, the centered watermark may degrade the quality of the image by interrupting a full view of the visual content of the image. The disclosed system and method address the problem by providing a solution rooted in computer technology, namely, by providing intelligent means of placing a watermark based on the characteristics of the image. For example, an image may be identified as having a salient region or a salient object and a non-salient region or a non-salient object by a trained convolutional network. The trained convolutional network determines the salient region or the salient object based on a saliency model generated using training data (e.g., sample images) fed to the convolutional network. The saliency model identifies features of an object class to identify a salient object or region in the image.

The trained convolutional network generates a saliency map of the image based on the saliency model when the image is fed through the convolutional network. An example of the saliency map is disclosed in U.S. patent application Ser. No. 15/393,206 entitled "IDENTIFICATION OF A SALIENT PORTION OF AN IMAGE," filed on Dec. 28, 2016, which is hereby incorporated by reference in its entirety for all purposes. The saliency map is customized based on the pixel data of each image. The saliency map identifies a salient region with the highest saliency value and a non-salient region with the lowest saliency value. Alternatively, the saliency map identifies a salient object with the highest saliency value and a non-salient object with the lowest saliency value. The salient region is deemed to be the most important region that includes the most important and prominent object. For example, if an image is a portrait, the face of an individual may be deemed to be the most salient region in the image, as it leads to a prediction of the individual portrayed in the image. If an image is a landscape picture (e.g., Statue of Liberty with a background of a boat in the river), the Statue of Liberty is likely to be deemed the most salient object in the image, as it leads to a prediction of the geographic location of the photograph. The salient object (e.g., Statue of Liberty) helps to determine where the photograph was taken or predict what in the image (e.g., the face) is the most important.

The disclosed system determines a type of the watermark and a level of aggressiveness (i.e., degree of aggressiveness) to use with an image. The type of watermark and the level of aggressiveness can be determined based on a weight model associated with the image. Each criterion of the weight model and its associated weight are based on information regarding the image such as a popularity level, a value of the image, a geographic region of the image, information regarding photographer's preference, a user account associated with the image, and the like. A user may select the criteria and a weight of each criterion for each individual image.

One general approach disclosed herein to place a watermark is to identify the salient parts of the image and leave those parts generally intact, while applying a more aggressive watermark to the non-salient parts of the image. If the digital media owner of an image so chooses, they can also choose to do the opposite and apply a more aggressive watermark to the salient parts of the digital media, while leaving the non-salient parts of the digital media less aggressively watermarked or intact.

The disclosed system further provides improvements to the functioning of a computer itself because it saves data storage space and reduces system loading times and the cost of system resources. Specifically, the computer hosting the image database is not required to maintain data storage or repeatedly share over a network with the convolutional neural network classification information based on the trained images, because the convolutional neural network, once trained, is configured to predict which features of the images in the image database correlate to particular object classes and which regions of the images are deemed salient.

The disclosed system further provides several advantages including providing a better presentation of visual content on a computing device by providing an image with a smart watermark applied at a proper degree of aggressiveness customized for each viewer (e.g., non-owning user). Moreover, the disclosed system further provides additional advantages including providing motivation for non-owning users to unlock teasing aspects of the image to obtain a full image that contains all the information which might not have been available. Thus, the owner (e.g., owning user) being able to better interact with the visual content (e.g., photograph, video) increases the quality and the number of interactions with the visual content. This can enhance user experience with the visual content on the computing device.

Example System Architecture

FIG. 1 illustrates an example architecture 100 for placement of a watermark on an image. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images, videos, and multimedia files (e.g., image database). The images can be searched using an image search engine (e.g., accessible through a web page on one of the clients 110). Images from the collection can also be used to train the neural network to identify features of the images and, with the addition of data indicating one or more objects, once identified, are likely to indicate whether the image contains one or more salient regions. The servers 130 can return images tagged with metadata indicating one or more salient regions and their locations within the images to the client devices 110. For purposes of load balancing, multiple servers 130 can host the neural network and multiple servers 130 can host the image database.

The servers 130 can be any device having an appropriate processor, memory, and communications capability for hosting the neural network, the image database, and the image search engine. The image search engine is accessible by various clients 110 over the network 150. The client devices 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Watermark Placement System

Figure 2:
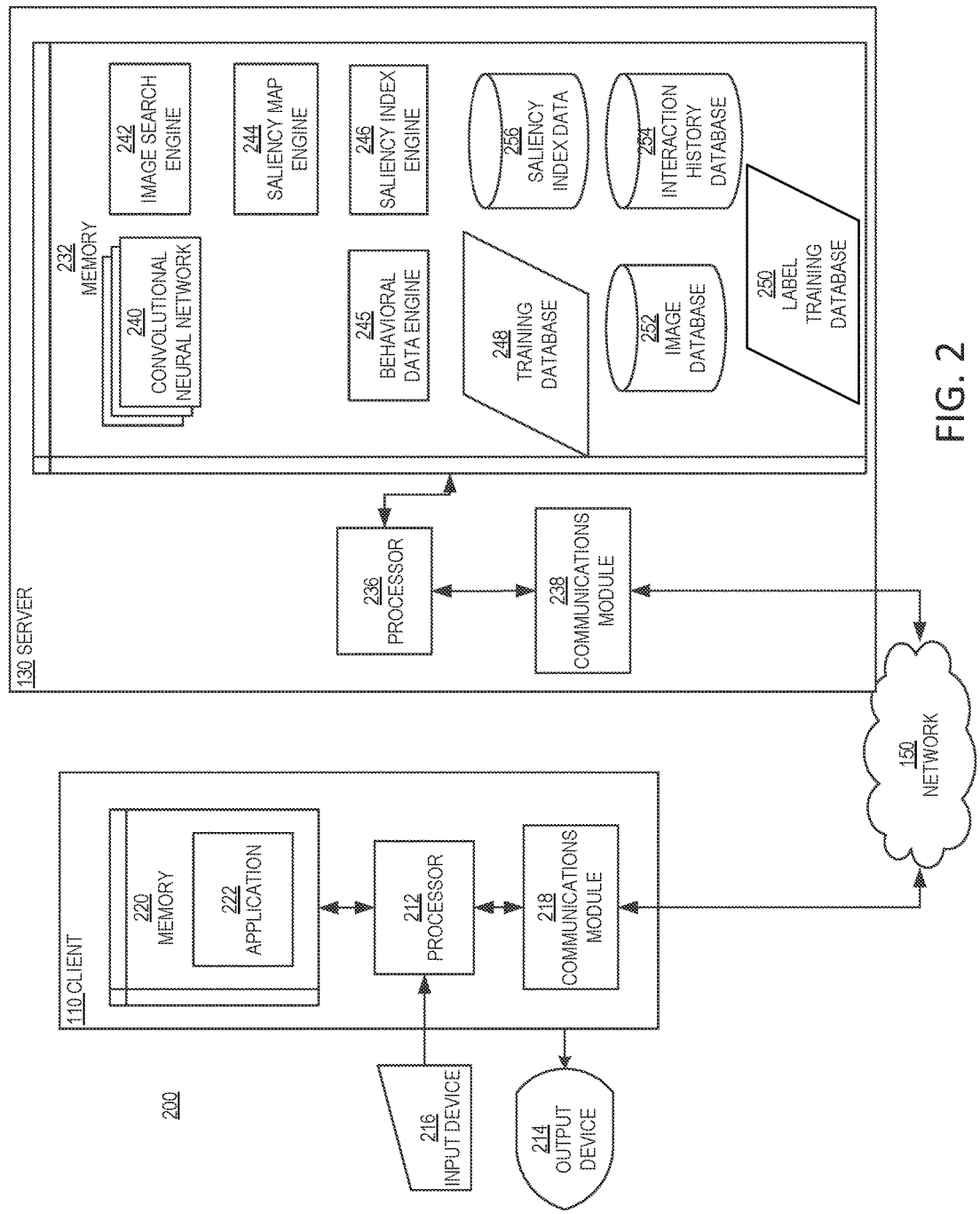
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and the communications module 238. The memory 232 of the server 130 includes a Convolutional Neural Network 240, an image search engine 242, a saliency map engine 244, a behavioral data engine 245 and a saliency index engine 246, a training database 248, a label training database 250, an image database 252, an interaction history database 254 and saliency index data 256.

In one or more implementations, the convolutional neural network 240 may be a series of neural networks. As discussed herein, a convolutional neural network 240 is a type of feed-forward artificial neural network where individual neurons are tiled in such a way that the individual neurons respond to overlapping regions in a visual field. The architecture of the convolutional neural network 240 may be in the object of existing well-known image classification architectures such as ALEXNET, GOOGLENET, or VISUAL GEOMETRY GROUP models. In one or more implementations, the convolutional neural network 240 consists of a stack of convolutional layers followed by a single fully connected layer. In this respect, the fully connected layer is the layer that maps the convolutional features to one of a plurality of training classes. The convolutional neural network 240 can include a loss layer (e.g., softmax or hinge loss layer) to back propagate errors so that the convolutional neural network 240 learns and adjusts its weights to better fit provided image data.

The memory 232 also includes an image database 252. In one or more implementations, the image database 252 represents a database that contains, for each image, a mapping from an image identifier to a data file containing pixel data for the image (e.g., in "JPEG," "TIFF," "GIF," "PNG" formats and the like). The image database 252 can be, for example, a dataset of trained images corresponding to an arbitrary number of object classes. Each of the images may include an indication of one or more salient regions present in the image.

Also included in the memory 232 of the server 130 is a training database 248. Training database 248 can be, for example, a dataset of content items (e.g., images) corresponding to an arbitrary number of object classes with a predetermined number of content items per object class. Training database 248 may include multiple instances (or sets) of training data, where each instance (or set) of training data is associated with a particular style class. For example, training database 248 may include images that include features that represent positive instances of a desired class so that the convolutional neural network 248 can be trained to recognize images with a feature of the desired class. In some embodiments, training database 248 includes a label indicating a style class strength (e.g., very candid, somewhat candid, not candid) as well as the images. Style class information may be useful to determine the saliency or lack thereof of a plurality of pixels in a portion of an image file, as disclosed herein.

Although training database 248 is illustrated as being separate from the image database 252, in certain aspects training database 248 is a subset of the image database 252. Furthermore, although the image database 252 and the image search engine 242 are illustrated as being in the same memory 232 of the server 130 as the convolutional neural network 240, in certain aspects the image database 252 and the image search engine 242 can be hosted in a memory of a different server but accessible by the server 130 illustrated in FIG. 2.

Memory 232 also includes a label training database 250. Label training database 250 may include targeted data gathered via third-party crowd-sourcing platforms (e.g., MTurk, CrowdFlower, etc.). Label training database 250 may include images from the image database 252 that are human labeled with information indicating a background descriptor according to a user (e.g., owner) that uploaded the image. Label training database 250 may be utilized to further refine the training of the convolutional neural network 240.

The behavioral data engine 245 may be a module executed by the processor 236 that is configured to monitor (and/or track) user interactions with the images. At runtime, the behavioral data engine 245 may facilitate incorporation of the gathered feedback by logging each occurrence of the query, image, salient object (or region) shown, and salient object (or region) selected, request regarding the image and the like. The behavioral data engine 245 may keep track of the frequency that a certain salient object or region is selected or which salient objects or regions are commonly selected.

The memory 232 also includes user interaction database 254. In certain aspects, the processor 236 is configured to determine the user interaction data 254 by obtaining user interaction data identifying interactions with images. In this respect, the processor 236 may determine that a user interacted with an image, such as, by clicking on a segment (or region) of the image identified as salient, saving the image for subsequent access, downloading the image on a client device 110, liking the image, bookmarking the image, or the like. The processor 236 may keep track of the user interactions over a given time period. In one or more implementations, the processor 236 may track the learned salient objects or regions of the last N images that the user interacted with as well as a current user query, where N is a positive integer value. The interaction history database 254 may also include data indicating user behavior (and/or patterns) with respect to the images.

The saliency map engine 244 may be a module executed by the processor 236 that is configured to identify the most salient and prominent objects in an image and their location within the image using the convolutional neural network 240. In one or more implementations, the processor 236 provides an example image to the saliency map engine 244 such that a trained convolutional neural network determines a saliency of each pixel in the example image with respect to an overall scene of the example image. In one or more implementations, the saliency map engine 244 is configured to generate a saliency map of the example image using the trained convolutional neural network 240. For each pixel in the example image, the saliency map can provide how likely the pixel belongs to a salient object (or salient region).

In one or more implementations, the saliency index engine 246 is configured to provide metadata from each image in the image database 252 to a saliency index data structure (e.g., saliency index data 256). In one or more implementations, the saliency index engine 246 is configured to provide tuples of image information from the saliency map engine 244 to the saliency index data structure. In one or more implementations, the saliency index engine 246 is configured to generate an association between each tuple of image information with a corresponding image of the image database 252 in the saliency index data structure.

In some aspects, the processor 236, using a relevance feedback database 254, can tag each of the images in image database 252 with metadata identifying an index to a corresponding salient region of the images or a non-salient region of the images, the metadata also identifying an index to a style class in a training database 248. For example, some of the images in image database 252 may be stored to provide background fields that may be useful in decompressing and reconstructing images. For such images having valuable background information, a background descriptor may emphasize this aspect in relevant feedback database 254. The tagging can serve as an indication of an association between a corresponding saliency value and one or more style classes. The metadata may be a metadata file including the background descriptor and stored as a flat document or an index identifying a storage location in image database 252. For example, the metadata file may include one or more rows of data including an image identifier, an image URL, a style identifier (e.g., identifying the corresponding style class), and a background descriptor.

The processor 236 of the server 130 is configured to execute instructions, such as instructions physically coded into the processor 236, instructions received from software in memory 232, or a combination of both. For example, the processor 236 is configured to submit a plurality of training images containing content identifying different semantic concepts (e.g., woman, coffee) to the convolutional neural network 240. The convolutional neural network 240 is configured to analyze image pixel data for each of the plurality of training images to identify features corresponding to a particular semantic concept. Based on the plurality of training images, the convolutional neural network 240 generates a saliency map when a new image is fed through the convolutional neural network 240.

The processor 236 is configured to receive a saliency map from the convolutional neural network 240 when an image is fed through the convolutional neural network 240. The saliency map includes a saliency value of a plurality of pixels in the image. Each region or object of the image includes a corresponding saliency value which indicates an importance level within the image. A more important area is deemed to be a more salient region or object which is associated with a higher saliency value than a less important area or object associated with a lower saliency value. The more important area is likely to lead to a prediction of an object that is more salient than other objects that are less salient in the image. Based on the saliency map, the processor 236 is configured to identify a salient region or object of the image and a non-salient region or object of the image. The salient region or object may have the highest saliency value and the non-salient region or object has the lowest saliency value.

The processor 236 is configured to determine a level of aggressiveness of a watermark to use with the image. The level of aggressiveness can be based on the weight model. The weight model is further explained in details in FIG. 3. The processor 236 is configured to overlap the watermark with at least one of the salient region and the non-salient region based on the level of aggressiveness to generate a watermarked image.

The processor 236 is configured to provide the watermarked image for display to the client device. The processors 236 can provide the watermarked image in various forms such as an image file, a pdf file, or a Hypertext Markup Language (HTML) file. In some aspect, the watermark is fixed to the watermarked image using an encryption code and may be irremovable. The watermark can be removed from the image using a decryption code.

The processor 236 is configured to receive a selection of at least one of the salient region or the non-salient region from the client device. In some embodiments, the processor 236 is configured to present a plurality of suggestions via a graphical user interface. The suggestions can include a plurality of types of watermarks or a plurality of aggressiveness levels that are optimal for the image. The suggestions can include a preview of the image overlapped with the suggested type of watermark based on the suggested level of aggressiveness. The first input indicating a selection of the type of watermark and the second input indicating a selection of the level of aggressiveness can be received from the user via the graphical user interface. The received inputs are implemented on the image.

The processor 236 is further configured to provide a first plurality of sample images to a trained convolutional neural network to generate a first saliency model and a second plurality of sample images to generate a second saliency model. The first plurality of sample images can be a different set of images than the second plurality of sample images. Accordingly, the first saliency model may be different from the second saliency model. For example, the first saliency model identifies a first region as a salient region and the second saliency model identifies a second region as a salient region which is different from the first salient region. The first salient region is identified as having a first salient object based on the first saliency map and the second salient region is identified as having a second salient object based on the second saliency model. In some cases, the first salient region or object may be different from the second salient region or object.

The processor 236 is configured to determine a weight model for the image. The weight model can include a plurality of weight criteria including information regarding a popularity of the user-provided image, a value associated with the user-provided image, geographic information associated with the user-provided image, information regarding photographer's preference, and a user account associated with the user-provided image. A respective weight may be assigned to each of the plurality of weight criteria.

The processor 236 is configured to determine a type of watermark to use with the image. The type of the watermark comprises overlaying content on the user-provided image, blurring a portion of the user-provided image, darkening a portion of the user-provided image, defocusing a portion of the user-provided image, softening a portion of the user-provided image, skewing a portion of the user-provided image, or removing visual content from the user-provided image. The types of watermarks are not limited to the above listed watermarks and other types of watermarks are available to use with the image. Various types of watermark can be used in the image based on the characteristics of the image.

In some embodiments, the processor 236 is configured to overlap the watermark with one or more regions in the image. If the image includes more than one region with a saliency value higher than a predetermined threshold value, a watermark can be overlapped with the identified one or more regions with the higher saliency values. A default threshold value can be set in the settings and the default threshold value can be changed by the user via the user interface.

Figure 3A:
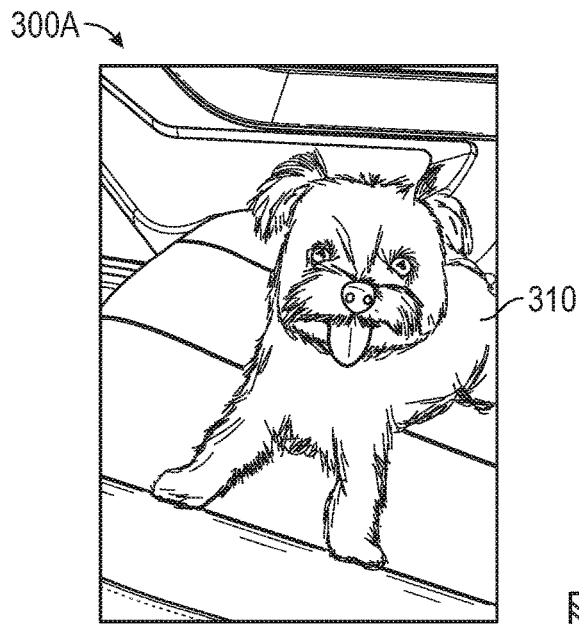
FIGS. 3A-3C illustrate example images for practicing an example watermarking process.
Figure 3B:
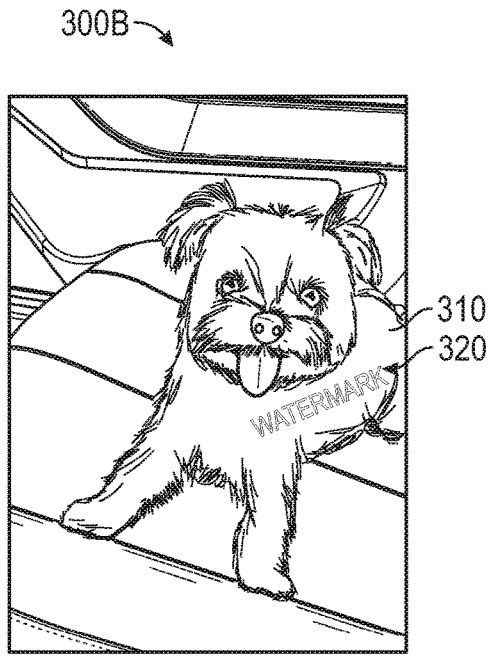
Figure 3C:
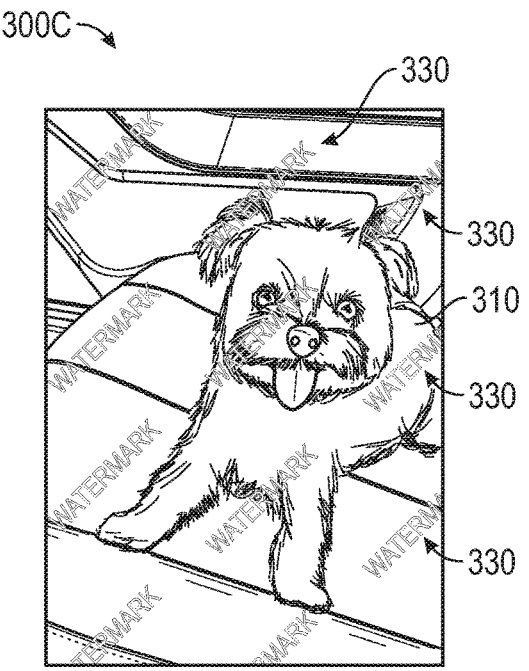

FIGS. 3A-3C illustrate example images for practicing a watermarking method according to some embodiments. The watermark placement method may be performed at least partially by the processor 236 in any one of servers 130 or by the processor 212 in any one of client devices 110 communicatively coupled through the network 150. For example, in some embodiments, a user may access the server 130 through the client device 110 and perform at least some of the operations performed on FIGS. 3A-3C through a user interface displayed on the client device 110. In some embodiments, at least some of the operations performed on FIGS. 3A-3C may be performed entirely by a processor 212 with the client device 110 by the user, without logging into the server 130 through the network 150.

FIG. 3A illustrates an image 300A that may be retrieved from the image database 252 by the image search engine 242. In some embodiments, an image 300A may also be captured by a peripheral device attached to the client device 110 (e.g., camera). A processor may be configured to parse the image 300A and perform a saliency partition of the pixels in the image into at least one "salient" region and at least one "non-salient" region (e.g. portion), according to a saliency value determined based on the saliency map (i.e., saliency criteria). The saliency map may be used to decide whether a pixel in the image belongs to a salient region or a non-salient region. The saliency value indicating the degree of saliency/prominence based on the saliency criteria may be determined.

Based on the saliency value, a dog 310 may be identified as a salient object in the image 300A and any part of the body of the dog may be identified as a salient region. For example, the face of the dog may be identified as the most salient region in the image, as the face is an important aspect leading to a prediction of the object in the image. For example, the face of a Maltese dog having two black eyes and a black nose with white hair may be an important aspect leading to a prediction that the identified object is a Maltese dog. In some embodiments, a different part of a dog body can be identified as a salient region. For example, ears and a long tail of a German Shepard dog can be identified as salient regions in the image as a German Shepard has unique ears and a tail which can help to identify the breed of the dog as a German Shepard. Determining the salient region in the image is further explained in FIGS. 4A-4D.

FIGS. 3B-3C illustrate watermarked images 300B-300C with watermarks embedded at different degrees of aggressiveness. Image 300B includes a less aggressive watermark 320 and image 300C includes a more aggressive watermark 330. The less aggressive watermark 320 is less visible in the image. For example, the size of the less aggressive watermark 320 may be smaller than that of the more aggressive watermark 330. The less aggressive watermark 320 may be translucent or semi-transparent, making it less noticeable and blend well with the image 300B. On the other hand, the more aggressive watermark 330 may be more visible in the image 300C. For example, the size of the more aggressive watermark may be larger than that of the less aggressive watermark 320. The more aggressive watermark 330 may be opaque, making it more invasive than the less aggressive watermark 320. In some embodiments, the more aggressive watermark 330 can be applied on (i.e., overlapped with)

more than one region in the image. For example, a watermark can be applied on the most salient region or object and another watermark can be applied on the second most salient region or object. Alternatively, a plurality of watermarks can be applied in the image regardless of the salient regions determined based on the salient values.

In some embodiments, the level of aggressiveness (i.e., degree of aggressiveness) of the watermark can be determined based on aggressiveness criteria. A level of aggressiveness is a degree of protection indicating a level of noticeability of a watermark in the image. A higher level watermark is more obstructive and noticeable in the image. On the other hand, a lower level watermark is less obstructive and noticeable in the image.

The aggressiveness criteria can include, but not limited to, the popularity of the image, the value of the image, the user account associated with a viewing user, information regarding photographer's preference, the geographical location associated with the user account, the subject of the image, the Uniform Resource Locator (URL) of the image, and the like. A weight assigned to each of the aggressiveness criteria is determined based at least in part on information associated with the image stored in the image database 252 and the user interaction data stored in the interaction history database 254. Each of the aggressiveness criteria is weighted according to the importance of the aggressiveness criteria. The interaction history data can include user browsing history within the network 150 and upload, download, and purchase history. The behavioral data engine 245 can predict important aspects of the image that lead to the user interaction (e.g., clicking, viewing, purchasing, or downloading) of the image based on the interaction history data. Based on the determined aspects of the image that led to the user interaction with the image, the behavioral data engine 245 can determine the weights for each of the aggressiveness criteria.

In some embodiments, the weights can be set by the user in settings of the user interface. For example, the user (e.g., owner) can specify an order of importance of each criterion for applying the watermark. The user may prioritize the aggressiveness criterion and its associated weights in an order that the user believes to be effective when deciding on the priority of the criteria. In some embodiments, the weights setting can be set as a default setting by the processor 236 that is determined to be optimal.

The value of the image can be used as a criterion for determining the level of aggressiveness of the watermark. The value of the image can include a monetary value, an aesthetic value, a sentimental value, and the like. The processor 236 receives information associated with the value of the image from the image database 252 and determines the level of aggressiveness that may be applied to the image. In some embodiments, the processor 236 may add the monetary value to the aesthetic value and calculate a total value of the image. The processor 236 may apply a more aggressive watermark on a less expensive image and a less aggressive watermark on a more expensive image. Alternatively, the processor 236 may apply a less aggressive watermark on a less expensive image and a more aggressive watermark on a more expensive image.

The popularity of an image can be used as a criterion for determining the level of aggressiveness of a watermark. The processor 236 receives the popularity level of a particular image from the image database 252. The popularity level may be determined based on the number of views of the image, the number of purchases of the image, the number of downloads of the image, the number of likes of the images, the number of times the image has been bookmarked, the number of times the image has been referred to other viewers, the number of times the image has been re-visited, etc. The user interaction associated with the image listed above is stored in the interaction history database 254. The processor 236 may apply a more aggressive watermark on a less popular image and a less aggressive watermark on a more popular image. For example, a large number of visitors will likely see the more popular image (than the less popular image) which can lead to a high volume of purchases or downloads of the image. To promote consumption of the more popular image (which will lead to a high volume of sales), the less aggressive watermark may be applied on the more popular image. Alternatively, the processor 236 may apply a less aggressive watermark on a less popular image and a more aggressive watermark on a more popular image. To promote consumption of a less popular image, a less aggressive watermark may be applied on a less popular image.

The interaction history including the information associated with the user account can be used to determine the level of aggressiveness of the watermark. For example, the user account may include information such as the user's occupation, website browsing history including the amount of time spent on the web site and the amount of time spent on each picture, and download history including monetary values (e.g., dollar value) of images purchased or downloaded previously and monetary value (e.g., dollar value) contributed to the image database 252 (i.e., uploaded). For example, a photographer may be determined to purchase images more than an editor. In this aspect, a lower level watermark (less aggressive watermark) can be overlapped with the image that the photographer is viewing rather than the image the editor is viewing. In some embodiments, a frequent purchaser is more likely to purchase images than the one-time purchaser is. In this regard, a lower level watermark (less aggressive watermark) can be overlapped with the image that the frequent purchaser is viewing rather than the image the one-time purchaser is viewing. In another embodiment, a frequent visitor of the website is more likely to purchase images than the one-time visitor is. In this regard, a lower level watermark (less aggressive watermark) can be applied to the image that the frequent visitor is viewing.

A region associated with the user account may be used as a criterion for determining the level of aggressiveness of a watermark. For example, the processor 236 may determine that a viewer living in Singapore is more likely to purchase a landscape image of Singapore than a viewer living in South Africa is. In this regard, a weight assigned to the region criterion is likely to be higher for a viewer living in the same continent than a viewer living in a different continent. In some embodiments, the weight assigned to the region criterion may be determined based on the distance of a user (i.e., region associated with a user account) and the geographic location identified in the image. The region of the user can be identified from a user profile associated with the user account. The region information can be retrieved from the interaction history database 254. For example, the region information may be determined based on an Internet Protocol (IP) address of the user. Each IP address may include a unique identifier that identifies the region of the IP address. The IP address accessing the image can be determined by the server 130 to identify the region of the user.

The geographic region of the image can be determined based on the saliency map. The saliency index engine 246 may determine a salient object (e.g., Statue of Liberty) in the image and determine location information (e.g., NYC) associated with the salient object. The saliency index engine 246 may include an index of geographic location and its associated images. The saliency index engine 246 may determine that the identified geographic location of the image is similar to geographic locations associated with the other images within the same index. Alternatively, a user (e.g., owner) may provide the geographic information associated with the image when uploading the image for public viewing. The location information of the salient object can be stored in the image database 252 with the image.

In some embodiments, the geographic region identified in the image can be received from the label training database 250. The label training database 250 includes images with human labeled information indicating a background descriptor according to a user (e.g., owner) that uploaded the image. The background descriptor may include the geographic location information that identifies the geographic region the image was taken.

Figure 4A:
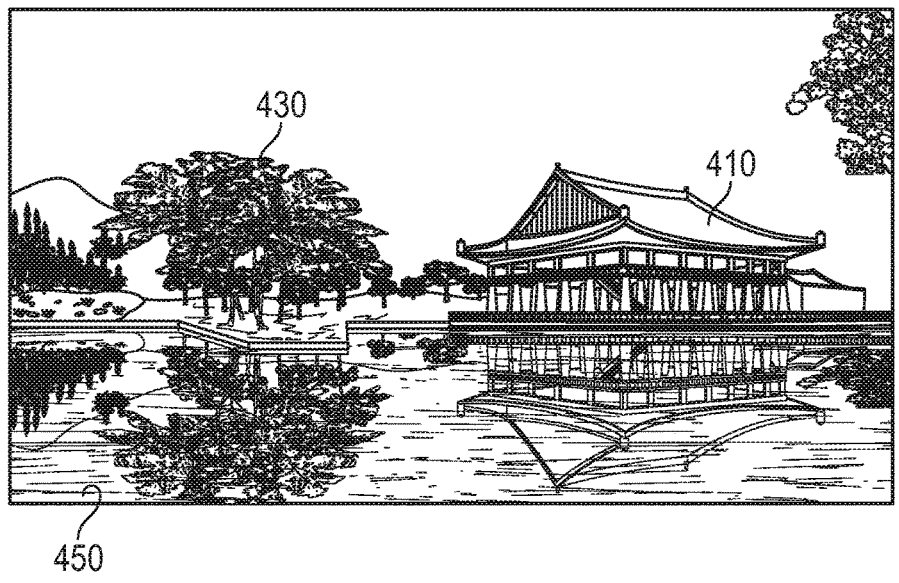
FIG. 4A-4D illustrate example images showing different positions of watermarks using the example server of FIG. 2.

FIGS. 4A-4D illustrate examples of watermarked images at different regions according to some embodiments. FIG. 4A illustrates an image 400A that may be retrieved from the image database 252 by the image search engine 242, in response to a search query (e.g., palace). The processor 236 may be configured to parse the image 400A and perform a saliency partition of the pixels in the image into at least one "salient" region (portion) and at least one "non-salient" region, according to a saliency map. The saliency map includes a saliency value of each pixel of the image relative to an overall scene of the image.

Figure 4B:
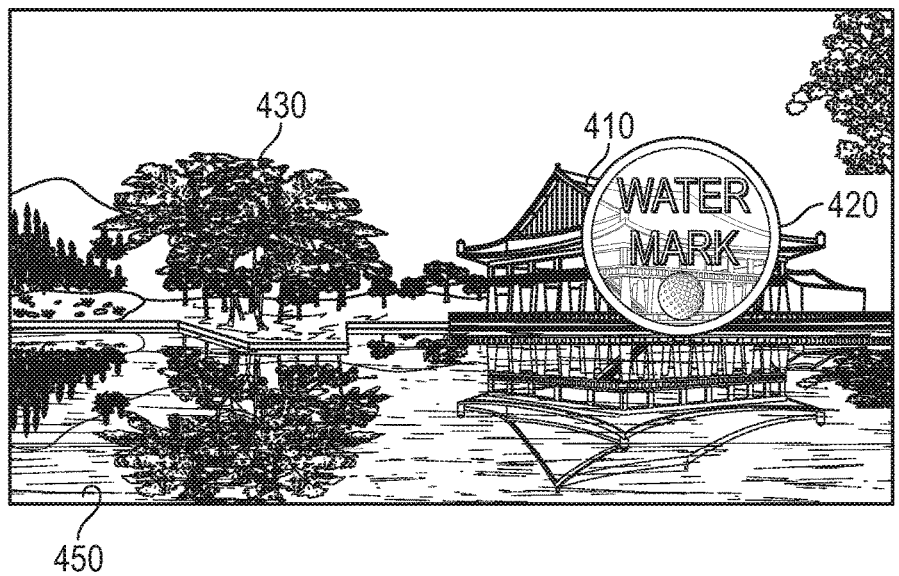

FIG. 4B illustrates an image 400B with a watermark 420 applied on a palace 410. The processor 236 may be configured to receive the image 400A and identify a salient region or object in the image 400A based on the saliency map. The palace 410 may be determined as the most salient region or object based on a first saliency map generated using a first set of training data via the convolutional neural network 240. The first saliency map can be generated based on a first saliency model. The first saliency model may provide instances of identifying features leading to a prediction of a palace. Upon determining that the palace 410 is determined to be the most salient region or object, a watermark 420 may be applied to the palace 410 as depicted in 400B.

Figure 4C:
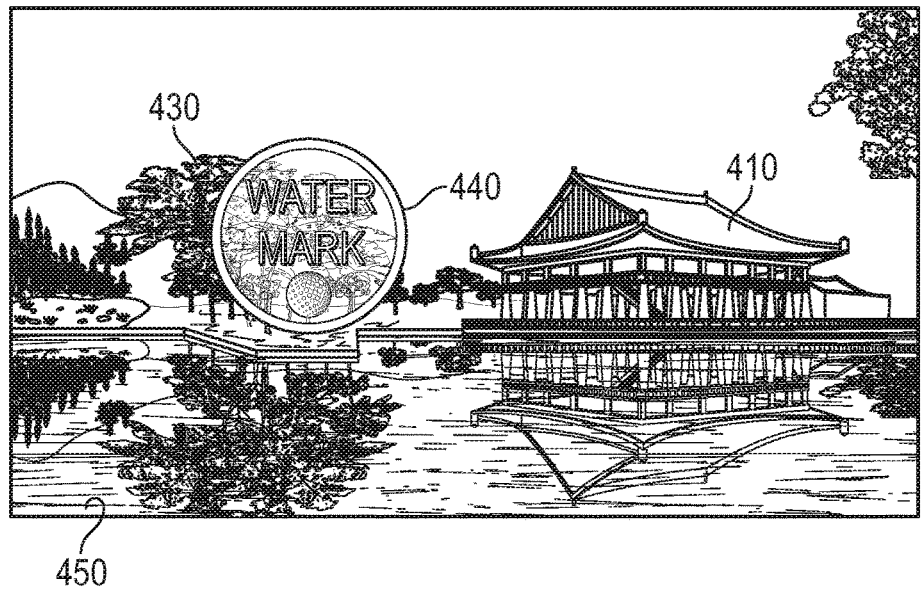

FIG. 4C illustrates an image 400C with a watermark 440 embedded on trees 430. The processor 236 may be configured to receive the image 400A and identify a salient region in the image 400A based on a second saliency map. The second saliency map is generated using a second set of training data by the convolutional neural network. The second set of training data includes sample images that are different from sample images of the first set of training data. The first set of training data may have a focus of a palace and the second set of training data may have a focus of a tree. Different sample images can create different saliency maps which identify different salient objects/regions in the same image. For example, the second saliency map can be generated based on a second saliency model. The second saliency model can provide instances of identifying features leading to a prediction of a tree.

In some embodiments, the user interface may present an option for a user to select a region for placing a watermark. The processor can identify a couple of regions in the image that are optimal for placing a watermark, and suggest those regions to the user via the user interface. A selection reflecting a user's choice on the region can be sent from the client's device 110 to the server 130. Upon receiving the selection, a watermark 440 is applied on the trees 430 upon receiving the selection.

In some embodiments, this can be done by instructing the server 130 to place a watermark on a specific area in the image (e.g., the trees 430). A user (e.g., owner) of the client device 110 may instruct the server 130 to place a watermark on a certain area in the image the user instructs. For example, a user may instruct the server 130 to place a watermark on a tree for any images that include a tree. When the processor 236 receives the saliency map that identifies a tree in the image, the processor may apply a uniform watermark on the tree. The user can, at any time, update the user preferences related to watermarks. The user can adjust the settings to selectively add or remove types of watermarks or limit the level of aggressiveness stored in memory 220 (e.g., locally on the client device 110 as opposed to remotely the server 130).

Figure 4D:
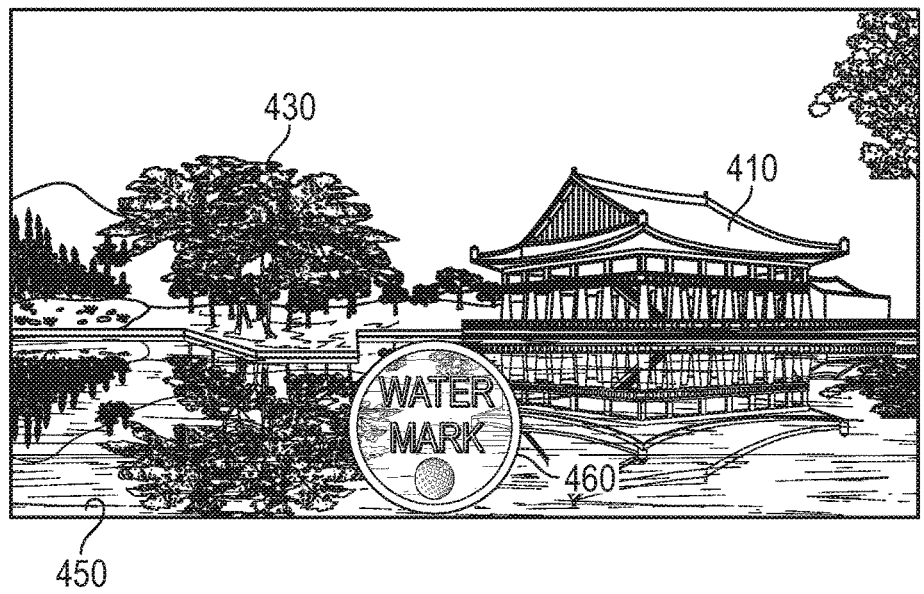

FIG. 4D illustrates an image 400D with a watermark 460 applied on a non-salient region (e.g., river 450). In some embodiments, the processor 236 may be configured to receive the image 400A and identify a non-salient region 450 in the image 400A. The river 450 may be determined to be the non-salient region based on the saliency map generated by the trained convolutional network. Upon determining that the river 450 is determined to be the non-salient region, a watermark 460 may be applied on the non-salient region, river 450, as depicted in 400D. In some embodiments, a default setting may be to place a watermark in a salient region. In another embodiment, the default setting may be to place a watermark in a non-salient region. The default setting may be changed in the user interface of an application 222.

In some embodiments, the default setting can be determined based on information regarding the photographer's preference. The system may receive data associated with a corresponding photographer's preference from the interaction history database 254 and use the preference data to change the default setting. In some embodiments, the default setting can be based on the categorization of the object. For example, the system is configured to take the salient region and perform object detection. The detected object can be categorized based on a type of object (e.g., desk, mirror, pillow). The system may use the categorization information to determine the default setting for the corresponding photographer.

As illustrated in FIGS. 3-5, different types of watermarks are available. For example, a watermark can be in a text format such as overlaying some text on an image as illustrated in FIGS. 3B-C. In some embodiments, a watermark can be in an image (e.g., logo, symbol, code) format. Alternatively, as illustrated in FIGS. 4B-4D, the watermark can be any combination of a text or image. In some embodiments, the watermark can be any form of image alteration such as darkening (e.g., blacking) some parts out as illustrated in FIG. 5B, blurring as illustrated in FIG. 5C, removing information from the image as illustrated in FIG. 5D, softening, defocusing, skewing, changing brightness, luminosity, and the like. The types of watermarks listed herein are not an exclusive list and there may be other types of available watermarks.

In some embodiments, to balance between the security and the enjoyment of image, the system may be configured to overlap a more intrusive watermark on a less salient region or object and overlap a less intrusive watermark on a more salient region or object. A watermark that can modify the actual image itself can be considered as a more intrusive watermark (e.g., blurring, blacking out). Alternatively, a watermark that enables the users to view the content behind the watermark can be considered as a less intrusive watermark (e.g., overlaying text over an image).

Figure 5A:
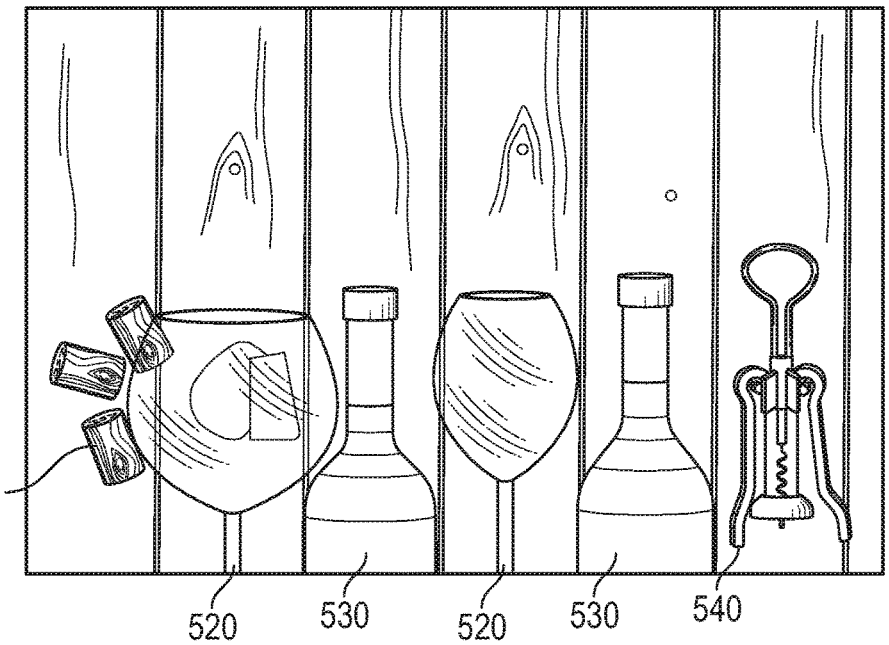
FIG. 5A-5D illustrates example images of various types of watermarks.
Figure 5B:
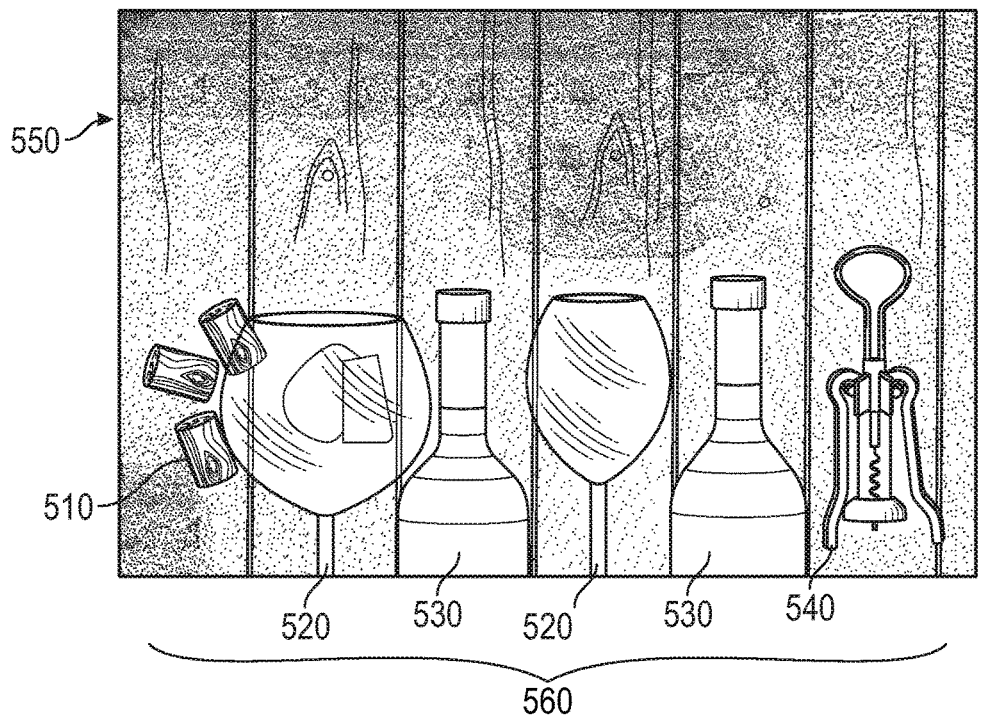
Figure 5C:
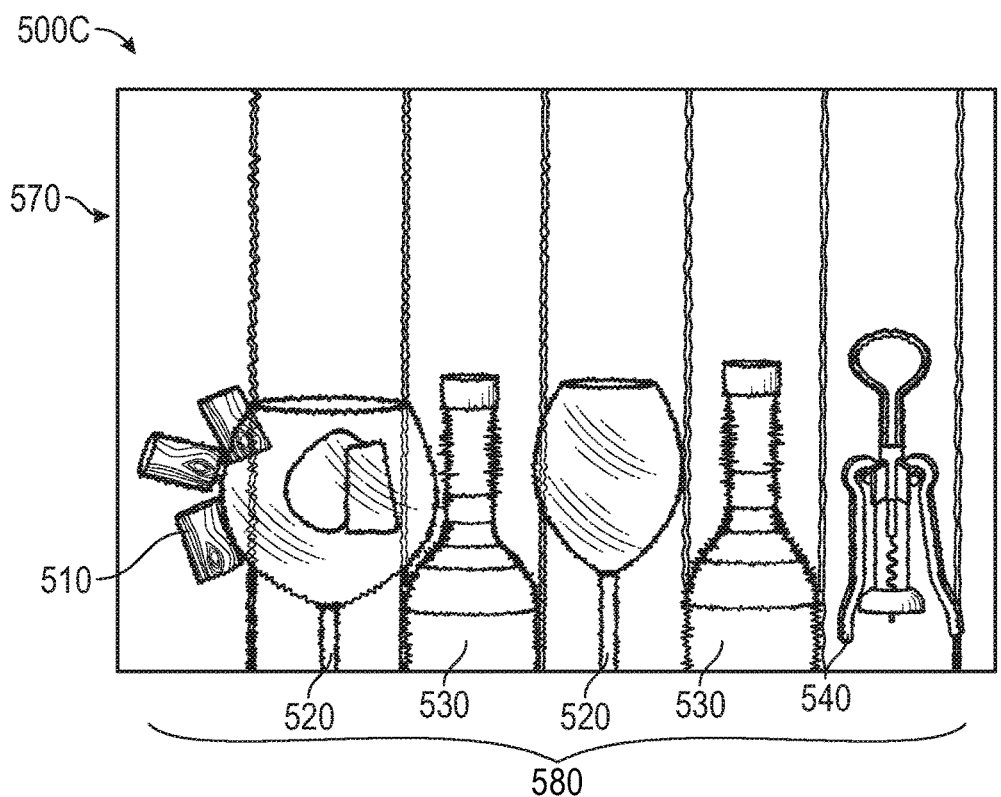
Figure 5D:
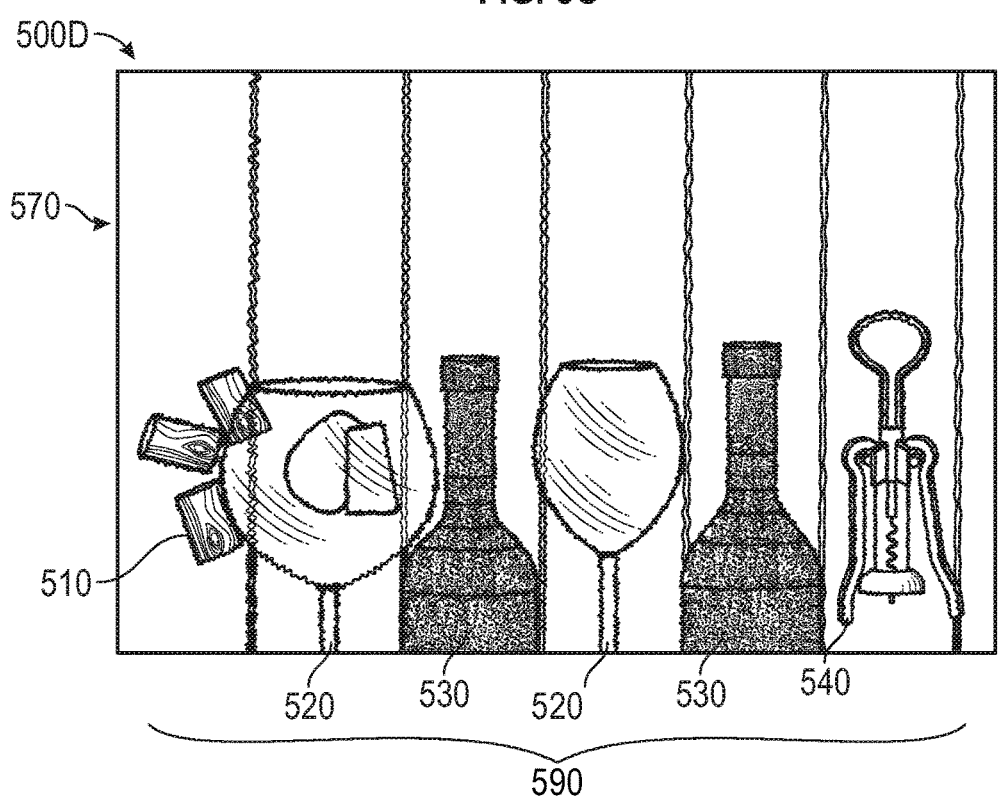
Figure 6:
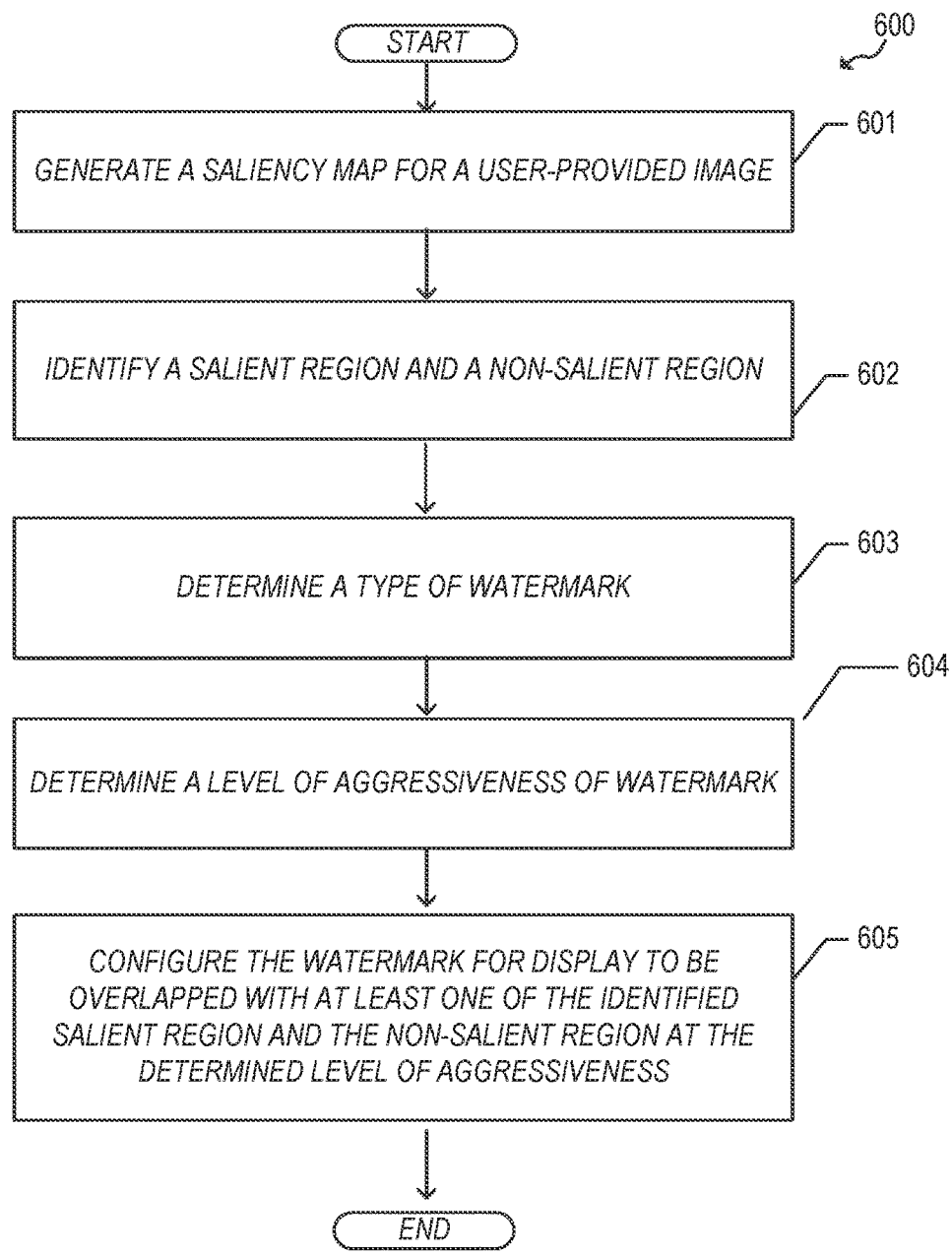
FIG. 6 illustrates an example watermarking process according to certain aspects of the disclosure.

FIGS. 5A-5D illustrate example images for practicing the example process of FIG. 6. FIG. 5A illustrates an image 500A with items having similar saliency values. The image 500A displays wine-related items such as wine corks 510, wine glasses 520, wine bottles 530, and a wine opener 540. The image 500A can be fed through the trained convolutional network 240 to determine the most salient object in the image. Many of the wine-related items in the image may lead to a prediction that a theme of the image is wine. However, in FIG. 5A, none of the wine-related items identified in the image may be determined to be more salient than the other with respect to determining the most salient object.

FIG. 5B illustrates an image 500B with a watermark embedded on a less salient region 550. In this aspect, the more salient region 560 showing salient objects may be unobscured and less salient region 550 (e.g., background) may be blacked out. The processor 236 may not determine one specific object that is more salient than the others since the objects in FIG. 5B are similar in sizes or theme. If the processor 236 determines one specific object that is not more salient than the other, the processor 236 may leave those areas 560 including the identified objects intact and apply a watermark to the less salient region 550.

FIG. 5C illustrates an image 500C with a watermark 570 applied to the entire image. The watermark (blurring) 570 may cover the entire image depending on a predetermined threshold value or a minimum threshold value. For example, a predetermined threshold value (i.e., percentage value) may be used to determine a salient object or region. The predetermined threshold value may be stored in the memory 232, but may be changed in the settings. The user of the client device 110 may change the predetermined threshold value at the client device 110. If the saliency value is above the predetermined threshold value, an area associated with a higher saliency value than the predetermined value may be identified. A watermark may be applied on the identified area. For example, if the predetermined threshold is 10%, top 10% area in the image that has the strongest prediction may be determined to be a salient region. In some embodiments, more than one area may be identified as the salient region.

Alternatively, a minimum threshold value (i.e., percentage value) may be used in connection with the predetermined threshold. The minimum threshold value may be lower than the predetermined threshold value. If none of the areas is determined to be higher than the predetermined threshold value, the minimum threshold value may be used. For example, if no object or region is identified to have a higher saliency value than the predetermined threshold value, a minimum threshold value of 50% may be used. Upon determining that no object or region is identified as a salient object or region, a minimum threshold process may be performed. Any area with the saliency value higher than the minimum threshold value of 50% may be identified and 50% of area in the image may be embedded with a watermark.

FIG. 5D illustrates an image 500D with an additional watermark applied on wine bottles 530. As illustrated in FIG. 5D, a certain watermark can block a portion of a view and degrade the quality of the image. Any content of the image (e.g., color, text, image, etc) can be removed from the image. The processor may be configured to determine to further embed an additional watermark on the image in connection with the existing watermark (FIG. 5C) as the additional watermark can provide an additional layer of protection to the image. In certain aspects, the processor 236 may determine that the image 500D includes certain visual content (e.g., brand logos, prohibited symbols, trademarked items, obscene pictures) that should not be displayed to the public, and need to be removed. However, the image 500D including such information can be accessed by certain authorized viewers (e.g., above a certain age, purchaser of the image). When the processor 236 detects above described visual content, the processor may be configured to compare the identified visual content with the stored list of content not suitable for public access received from the saliency index data 256. Once the processor determines that the identified visual content matches with the stored list, the processor 236 may apply an additional watermark to remove that information from the image, and the identified visual content may not be displayed.

FIG. 6 illustrates an example process 600 of placing a watermark on an image. The process 600 begins by proceeding from start step to step 601 when an image is fed through the convolutional neural network 240 to generate a saliency map. The saliency map is generated based on the pixel data of the image and a saliency model generated using a set of training data fed through the convolutional neural network. The training data (e.g., sample images) are fed through the convolutional neural network to generate the saliency model that can identify a salient object and its associated saliency.

In step 602, a salient region (i.e. salient object) and a non-salient region (i.e. non-salient object) are identified based on the saliency map. The saliency map provides a plurality of saliency values of each pixel of the image. A saliency value is indicative of the likelihood that a pixel within the image is salient. The most salient region having the highest saliency value identifies an important aspect of the image and the most non-salient region having the lowest saliency value identifies a less helpful aspect of the image. A watermark can be overlapped with (i.e., applied on) either salient region or non-salient region. In some embodiments, the selection can be made by the user.

In step 603, the type of watermark may be determined (e.g., watermarks 320, 420, and 530). In step 604, the level of aggressiveness may be determined. The level of aggressiveness is determined based on a weight model which includes a plurality of aggressiveness criteria (weight criteria). The weight criteria can include the popularity of the image, the value of the image, geographic information of the image, and the user account associated with the image. A respective weight is assigned to a corresponding weight criterion based on an importance of each criterion. In some embodiment, the user may assign a weight to each weight criterion and chooses an order of the criterion. The weight model is further explained in FIG. 3.

Generally, a less aggressive watermark enables viewers to see and enjoy an image more than a more aggressive watermark as it leaves most of the areas intact. The less aggressive watermark better enables public enjoyment of the image making the image more accessible for the general public. While the less aggressive watermark focuses on the enjoyment and accessibility of the image, a more aggressive watermark focuses on the security and protection of the image. In other words, the more aggressive watermark can obscure the image and make the image less usable to any unauthorized persons or uses. The more aggressive watermark may devalue the image and lead to image degradation more than the less aggressive watermark may. Also, the more aggressive watermark may be difficult to remove from the image than the less aggressive watermark, while protecting the authorship of the image. Other types of watermarks can be applied in the same manner depending on the level of aggressiveness.

In step 605, the determined watermark is configured to overlap with one of the determined salient region and the non-salient region based on the level of aggressiveness. The watermark is embedded on the image that it may look like it is superimposed on some portion of the image. The watermarked image is displayed to the client device for display, and the watermark is irremovable from the image at the client device (i.e., fixed to the watermarked image).

Figure 7:
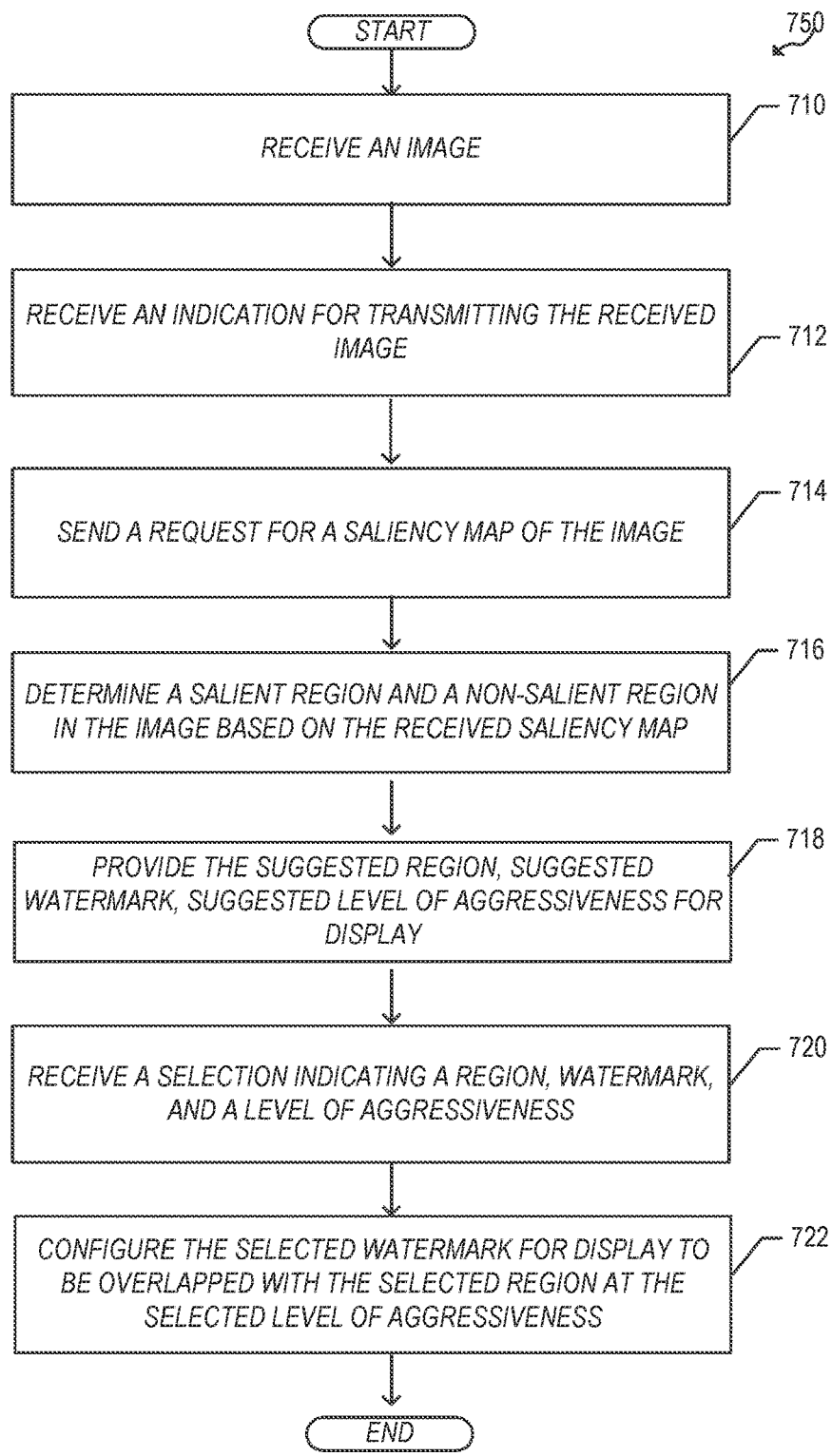
FIG. 7 illustrates an example watermarking process at a client computing device according to certain aspects of the disclosure.

FIG. 7 illustrates an example process 750 of placing a watermark on an image at the client device 110. At step 710, an image may be received at the client device 110. The image may be captured on the client device 110 or taken by a camera in the client device 110. Alternatively, the image can be transmitted from another client device 110. At step 712, the processor 212 receives an indication to transmit the image (e.g., sending an image via a text message) from the client device 110 to another client device 110 or the server 130. At step 714, upon receiving the indication, the processor 212 sends a request for the saliency map to the server 130. The processor 236 receives the saliency map of the image from the server 130 in return. At step 716, the processor 212 identifies a salient region and a non-salient region in the image based on the received saliency map. The processor 212 provides a listing of regions with the saliency value information to the user via a user interface.

At step 718, the user may further be provided with the list of suggested types of watermarks and the suggested level of aggressiveness based on the user history associated with the client device 110 and image information. The list can include a plurality of suggestions for the user to select. The user history can be retrieved from the behavioral data engine 245. At step 720, the user can select the region, the type of watermark, and the level of aggressiveness.

At step 722, in response to receiving a selection on the region, the watermark, and the level of aggressiveness, the processors 212 is configured to overlap the selected watermark with the selected region at the selected level of aggressiveness. The watermarked image may then be transmitted to another client device 110 or the server 130.

Hardware Overview

Figure 8:
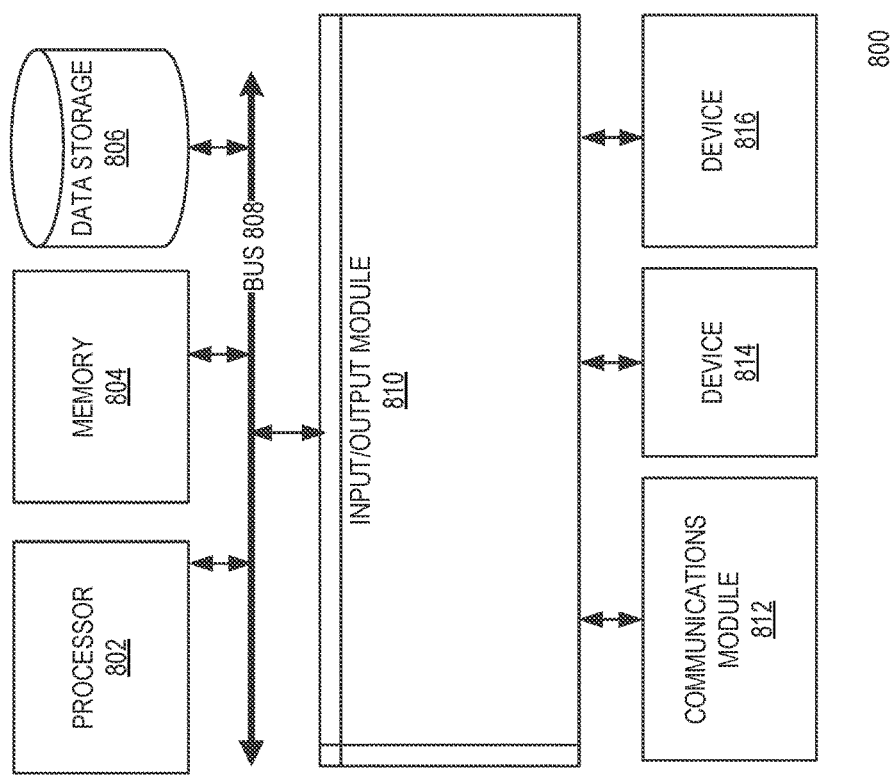
FIG. 8 is a block diagram illustrating an example computer system with which the client and server of FIG. 2 can be implemented.

FIG. 8 is a block diagram illustrating an exemplary computer system 800 with which the client 110 and server 130 of FIG. 1 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, the input/output module 810 is configured to connect to a plurality of devices, such as an input device 814 (e.g., input device 216) and/or an output device 816 (e.g., output device 214). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor for execution. Such a medium may take many forms, including, but not limited to, non-volatile media, volatile media, and transmission media. Non-volatile media include, for example, optical or magnetic disks, such as data storage device. Volatile media include dynamic memory, such as memory. Transmission media include coaxial cables, copper wire, and fiber optics, including the wires that comprise bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   generating a saliency map for a user-provided image, the saliency map comprising a saliency value of a plurality of pixels in the user-provided image;
   identifying, based on the saliency map, a salient region of the user-provided image having a highest saliency value and a non-salient region of the user-provided image having a lowest saliency value;
   identifying a geographic region associated with a second user account from a user profile of a second user accessing the user-provided image;
   determining a level of aggressiveness of a watermark to use with the user-provided image based on a weight model, the weight model including a distance of the geographic region associated with the second user account to a geographic region identified in the user-provided image; and
   configuring the watermark to overlap with at least one of the salient region and the non-salient region of the user-provided image based on the level of aggressiveness to generate a watermarked image.

2. The computer-implemented method of claim 1, further comprising:
   providing the watermarked image for display to a client device, wherein the watermark is fixed to the watermarked image.

3. The computer-implemented method of claim 2, further comprising:
   receiving, from the client device, a selection of at least one of the salient region or the non-salient region.

4. The computer-implemented method of claim 1, further comprising:
   providing a first plurality of sample images to a trained convolutional neural network to generate a first saliency model, wherein the first saliency model is configured to provide instances of identifying features leading to a prediction of a first salient object in a first salient region of an image; and
   generating a first saliency map of the user-provided image based on the first saliency model.

5. The computer-implemented method of claim 4, further comprising:
   providing a second plurality of sample images to the trained convolutional neural network to generate a second saliency model, wherein the second saliency model is configured to provide instances of identifying features leading to a prediction of a second salient object in a second salient region of an image, wherein the second saliency model is different from the first saliency model; and
   generating a second saliency map of the user-provided image based on the second saliency model.

6. The computer-implemented method of claim 5, further comprising:
   determining the second salient region having the second salient object different from the first salient object; and
   configuring the watermark to overlap with the second salient region.

7. The computer-implemented method of claim 1, wherein the weight model comprises a plurality of weight criteria comprising information regarding a popularity of the user-provided image, a value associated with the user-provided image, geographic information associated with the user-provided image, and a user account associated with the user-provided image, and wherein a respective weight is assigned to each of the plurality of weight criteria.

8. The computer-implemented method of claim 1, further comprising:
   determining a type of watermark, wherein the type of watermark comprises overlaying content on the user-provided image, blurring a portion of the user-provided image, darkening a portion of the user-provided image, defocusing a portion of the user-provided image, softening a portion of the user-provided image, skewing a portion of the user-provided image, or removing visual content from the user-provided image.

9. The computer-implemented method of claim 1, wherein the watermark is overlapped with one or more regions in the user-provided image upon determining that respective saliency values corresponding to the one or more regions are above a predetermined threshold.

10. The computer-implemented method of claim 1, further comprising:
    presenting a plurality of suggestions comprising a suggested type of watermark and a suggested level of aggressiveness;
    receiving a first input indicating a selection of the suggested type of watermark; and
    receiving a second input indicating a selection of the suggested level of aggressiveness.

11. A system comprising:
    one or more processors;
    a computer-readable storage medium coupled to the one or more processors, the computer-readable storage medium including instructions that, when executed by the one or more processors, cause the one or more processors to:
      generate a saliency map for a user-provided image, the saliency map comprising a saliency value of a plurality of pixels in the user-provided image;
      identify, based on the saliency map, a salient region of the user-provided image having a highest saliency value and a non-salient region of the user-provided image having a lowest saliency value;

identify a geographic region associated with a second user account from a user profile of a second user accessing the user-provided image;

determine a level of aggressiveness of a watermark to use with the user-provided image based on a weight model, the weight model including a distance of the geographic region associated with the second user account to a geographic region identified in the user-provided image;

configure the watermark to overlap with at least one of the salient region and the non-salient region of the user-provided image based on the level of aggressiveness to generate a watermarked image; and provide the watermarked image for display to a client device, wherein the watermark is fixed to the watermarked image.

12. The system of claim 11, wherein the instructions further cause the one or more processors to receive, from the client device, a selection of at least one of the salient region or the non-salient region.

13. The system of claim 11, wherein the instructions further cause the one or more processors to:

provide a first plurality of sample images to a trained convolutional neural network to generate a first saliency model, wherein the first saliency model configured to provide instances of identifying features leading to a prediction of a first salient object in a first salient region of an image; and generate a first saliency map of the user-provided image based on the first saliency model.

14. The system of claim 13, wherein the instructions further cause the one or more processors to:

provide a second plurality of sample images to the trained convolutional neural network to generate a second saliency model, the second saliency model configured to provide instances of identifying features leading to a prediction of a second salient object in a second salient region of an image, wherein the second saliency model is different from the first saliency model; and generate a second saliency map of the user-provided image based on the second saliency model.

15. The system of claim 14, wherein the instructions further cause the one or more processors to:

determine the second salient region having the second salient object different from the first salient object; and configure the watermark to overlap with the second salient region.

16. The system of claim 11, wherein the weight model comprises a plurality of weight criteria comprising information regarding a popularity of the user-provided image, a value associated with the user-provided image, geographic information associated with the user-provided image, and a user account associated with the user-provided image.

17. The system of claim 11, wherein the instructions further cause the one or more processors to determine a type of watermark, the type of watermark comprising overlaying content on the user-provided image, blurring a portion of the user-provided image, darkening a portion of the user-provided image, defocusing a portion of the user-provided image, softening a portion of the user-provided image, skewing a portion of the user-provided image, or removing visual content from the user-provided image.

18. The system of claim 11, wherein the watermark is overlapped with one or more regions in the user-provided image upon determining that respective saliency values corresponding to the one or more regions are above a predetermined threshold.

19. The system of claim 11, wherein the instructions further cause the one or more processors to:

present a plurality of suggestions comprising a suggested type of watermark and a suggested level of aggressiveness;

receive a first input indicating a selection of the suggested type of watermark; and receive a second input indicating a selection of the suggested level of aggressiveness.

20. A computer-implemented method, comprising:

sending, at a client device, a request for a saliency map of an image, the saliency map comprising a saliency value of a plurality of pixels in the image;

authorizing a remote server to access a user profile and identify a geographic region associated with a second user account;

receiving, from a trained convolutional neural network, the saliency map identifying a salient region of the image having a highest saliency value and a non-salient region of the image having a lowest saliency value in the image;

determining a level of aggressiveness of a watermark to use with the image based on a weight model, the weight model including a distance of the geographic region associated with the second user account to a geographic region identified in the image; and configuring, at the client device, the watermark to overlap with at least one of the salient region and the non-salient region of the image based on the level of aggressiveness to generate a watermarked image.

* * * * *